United States Patent
Buehler et al.

(10) Patent No.: US 9,032,076 B2
(45) Date of Patent: May 12, 2015

(54) ROLE-BASED ACCESS CONTROL SYSTEM, METHOD AND COMPUTER PROGRAM PRODUCT

(75) Inventors: Dieter Buehler, Tuebingen (DE); Thomas Hurek, Leinfelden (DE); Donald N. Jones, Cary, NC (US)

(73) Assignee: International Business Machines Corporation, Armonk, NY (US)

( * ) Notice: Subject to any disclaimer, the term of this patent is extended or adjusted under 35 U.S.C. 154(b) by 1195 days.

(21) Appl. No.: 11/242,247

(22) Filed: Oct. 3, 2005

(65) Prior Publication Data

US 2006/0089932 A1 Apr. 27, 2006

(30) Foreign Application Priority Data

Oct. 22, 2004 (EP) ..................................... 04105243

(51) Int. Cl.
*G06F 15/173* (2006.01)
*H04L 29/06* (2006.01)
*G06F 21/62* (2013.01)

(52) U.S. Cl.
CPC .......... *H04L 63/105* (2013.01); *G06F 21/6218* (2013.01)

(58) Field of Classification Search
USPC ................................................. 709/227–229
See application file for complete search history.

(56) References Cited

U.S. PATENT DOCUMENTS

| 6,202,066 | B1 * | 3/2001 | Barkley et al. ..................... 707/9 |
| 6,460,141 | B1 * | 10/2002 | Olden ................................ 726/4 |
| 2002/0169876 | A1 * | 11/2002 | Curie et al. .................... 709/226 |
| 2002/0188869 | A1 * | 12/2002 | Patrick ........................... 713/201 |
| 2003/0046576 | A1 * | 3/2003 | High et al. ..................... 713/200 |
| 2003/0078932 | A1 | 4/2003 | Kaiserwerth et al. |
| 2004/0162894 | A1 * | 8/2004 | Griffin et al. ................. 709/223 |
| 2004/0162906 | A1 * | 8/2004 | Griffin et al. ................. 709/229 |

OTHER PUBLICATIONS

Han et al., "Constraint Specification for Object Model of Access Control based on Role," ACM SIGSOFT Software Engineering Notes, vol. 25, Issue 2, pp. 60-63, Mar. 2000.

* cited by examiner

*Primary Examiner* — Jackie Zuniga Abad
(74) *Attorney, Agent, or Firm* — Ed Choi; Hoffman Warnick LLC (57) ABSTRACT

The invention relates to a role-based access control system, including a role definition system for defining roles to be sets of permissions on individual resources thus forming role instances, respectively; and a super role definition system for defining at least one super role by grouping a set of role instances into one super role, wherein the one super role contains all permissions contained in the grouped resource instances. Furthermore, the present invention deals with an appropriate method, a computer program and a computer program product.

17 Claims, 3 Drawing Sheets

ROLE-BASED ACCESS CONTROL SYSTEM, METHOD AND COMPUTER PROGRAM PRODUCT

BACKGROUND OF THE INVENTION

1. Field of the Invention

The present invention relates to a method and a system for security authorisation of networked computer resources, and especially to technology for providing access control to system resources.

2. Related Art

Service system functionality usually includes a so-called resource management through which a server synchronises and manages access to one or more resources such as databases or database servers. Requests from a client are received by the server system, processed, and appropriate accesses to the resources are made. A response to the client system is then created and transmitted to the client system. This general model is applicable to many server paradigms, including online banking, order entry and tracking, e-commerce, and even electronic mail processing. Client programs typically handle user interactions, such as presenting drop down lists, menus and pages of information. Client programs also typically include functionality to request data or to initiate some data modification on behalf of a user by the server system. In many cases, a single server system is used by multiple clients simultaneously. For example, dozens or hundreds of clients can interact with a handful of services that control database access. Using such an arrangement of system and functionality, the client systems are isolated from having to know anything about the actual resource managers and resources. It needs only to have the capability to communicate and interact with the server systems, and does not have to have specific capabilities or software to communicate directly with resources. The resource manager within the server systems is often assigned the task of security and access control such that users requesting secure data from the resources may be allowed or denied access to that data.

Access control for computer-based resources, such as servers or storage spaces, can be used to prevent those outside of an organisation from accessing the resources and can also be used to limit access by internal personnel.

The classical access control has been provided through the use of access control lists (ACL), whereby users are associated with specific permissions to access or to interact with various resources. To this extent, an ACL is typically viewed as a person-by-person or group-by-group enumeration of permissions.

Whenever a permission within an ACL changes, the ACL must be recreated with the changed permission. Configuring or changing an ACL is not an easy process. This is especially the case where finely grained control over the permission levels is desired, such as when resources are arranged as a hierarchical tree of nodes. The classical role-based access control model lacks the possibility to enforce different access control constraints on individual resource instances. To overcome this problem, extensions have been made to the classical model defining roles to be sets of permissions on individual resources (resource-level role-based access control (RRBAC)). Two of the most important examples in this area are the J2EE (Java 2 Platform, Enterprise Edition) authorisation model and the so-called WebSphere™ Administration Roles which are described in U.S. Patent Application Publication No. U.S. 2003/0229623 A1. WebSphere™, a product from International Business Machines, is an application server which is available for a number of platforms, including computers from personal computers to high-end "main frames" running operating systems from Microsoft Windows NT™ to IBM's AIX™ to the open source Linux.

The J2EE authorisation model or the pure role based access control (RBAC) model do not provide instance level resource protection.

U.S. 2003/0229623 A1 describes a further role based access control model that forms a basis for the administrative roles introduced with WebSphere 5.0™. This model is not very generic and flexible.

The J2EE authorisation model together with the Java Authorisation Contract for Containers defines J2EE roles to consist of individual permission that allow either access to specific World Wide Web (WWW) content or business logic exposed by individual Java Enterprise Beans. The protection of individual resource instances is very limited. The granularity is defined by the interfaces exposed by the Java Enterprise Beans and information that can be directly met to Web Universal Resource Locators (URLs).

It would be desirable to have a more flexible system accompanied by a simplification of access control administration reducing the likelihood of administration errors.

SUMMARY OF THE INVENTION

The present invention provides a system, method, computer program product, and computer program for role-based access control.

The present invention provides a role-based access control system, which comprises a role definition system for defining roles to be sets of permissions on individual resources thus forming role instances, respectively, and a super role definition system for defining at least one super role by grouping a set of role instances, wherein each super role contains all permissions contained in the grouped role instances.

In another embodiment of the system, the system further comprises a super role assignment system for assigning super roles to individual users or user groups.

The super roles' concept extends the RRBAC models by providing a means to aggregate individual RRBAC roles into higher level roles called super roles.

It is possible that the role definition system can be based on the J2EE authorisation model.

In another embodiment of the system, the roles defined by the definition system correspond to administrative roles. Those administrative roles can be so-called Administration Roles, particularly so-called WebSphere™ Administration Roles which are disclosed and described in U.S. 2003/0229623 A1. Those roles are introduced with the WebSphere Portal 5.0™ product from IBM.

Furthermore, another embodiment of the method can be based on a so-called inherited role-based access control (IRBAC) model, which is described in U.S. patent application Ser. No. 010/889,625, not yet published, and expressly incorporated herein by reference in its entirety.

For a better understanding, this model will be shortly described in the following. The IRBAC model is based on roles that consist of permissions. Permissions, in turn, are scoped to individual resources. The IRBAC model defines an inheritance model that allows a convenient definition of such role instances based on role types, modelling different ways of interaction, that protect access to specific sub-hierarchies of a protected resource hierarchy. IRBAC permissions are scoped to individual resources and consist of one action and one reference to a domain resource. In IRBAC, access to sensitive operations, for example editing a specific document, is mapped to one or more corresponding permissions. Roles are assigned to users or user groups granting those users or user groups the permissions contained in the corresponding roles. The user or the user group is allowed to execute such a sensitive operation, if the union of all permissions contained in all the role instances assigned to this user or to the user group contains all the permissions required by the sensitive operation. One essential point within the IRBAC model is the way in which role instances are created and managed, for example how a set of permissions that are considered being part of a specific role instance are determined. The IRBAC model defines three concepts to allow for convenient management of such roles, namely a role type, role block and domain root resource. Within the IRBAC model, each role instance has an associated role type. The role type is a set of actions in the first place and models a specific way of interacting with resources depending on job responsibilities, for example a role type called "Editor" could contain actions like "View", "Edit", "Add child", etc., because editors are usually responsible for modifying resources and creating new resources.

Furthermore, each role instance has an associated domain root resource. This is just some specific resource within a hierarchy of protected resources. The set of permissions contained in a specific IRBAC role instance is defined by building the Cartesian Product between the set of actions contained in the corresponding role type and the set of resources contained in the sub-tree rooted in the role's domain root resource, the so-called role domain. Role domains can be restricted by introducing role blocks. Role blocks can be tied to individual resources and role blocks are role type specific. A role block prevents the sub-tree rooted at the resource carrying the block from being included in role domains of the same role type and some ancestor domain root resource.

The IRBAC realised in WebSphere Portal 5.0™ provides a fine grained delegation model. The operations to create/delete role assignments and to create/delete role blocks are protected by enforcing a specific permission and permissions according to the involved role type on the affected resources, and a specific permission on the affected users or user groups.

While the IRBAC model provides an inherited role based access control system, the method according to the present invention provides an even more flexible system accompanied by a further simplification of access control administration.

Therefore, it is possible in a further embodiment of the method with reference to the IRBAC model, that the role definition system corresponds to a role definition system for defining at least one set of permissible actions for at least one role type, further comprising a role binding system for binding the at least one role type to at least one node of a structure of nodes, wherein the nodes represent computer-based resources, thus forming at least one role instance. A plurality of so-formed role instances build up a structure of role instances corresponding to a hierarchical tree of role instances and each role instance within the structure of role instances has an associated domain root instance, so that an instance of a role type is inherited by hierarchical descendants of the domain root instance. That means that the super roles concept extends the previously described IRBAC model.

It is possible that the role based access control system further comprises a role blocking system for establishing a role type block for the role type, wherein the role type block limits inheritance of the instances of the role type.

In a possible embodiment of the system, the one super role can be modified by adding and/or removing role instances from the grouped set of role instances defining the super role.

In a further embodiment of the present invention, each super role within the role-based access control system is registered within a structure of protected resource instances, thus defining a protected super role instance. That means that the character of the super role is at the same time being protected by the access control system and providing permissions on other protected resources.

In another embodiment, the super roles are nestable, forming a super role nesting structure. In this case, the super roles are registered at the protected resource hierarchy according to their nesting structure. The semantics of nested super roles is that a super role contains all permissions that are contained in all RRBAC role instances contained in the super roles and all super roles nested into the super role.

In a further embodiment of the invention the super role is assigned dynamically to at least one user or user group by associating an assignment condition to individual super role assignment.

Therefore, the role instances, already defined in the previously described models, can be grouped into super roles and super roles can be nested. This allows managing role assignments on a semantic level. This reduces access control administration complexity and thus reduces costs as well as errors that could result in unintended access control configurations. This simplifies consistent dynamic binding of users and user groups to access control configurations through dynamic super role assignments. One super role assignment can represent a high number of already known role assignments. This reduces the amount of access control data to be persisted. This allows for a more efficient implementation of a corresponding access control engine.

Super role instances are registered for example at a protected resource hierarchy according to their super role nesting. Thereby, access control delegation flexibility is improved. Access to individual super role instances, as for example the ability to assign specific super roles to a specific user, can be controlled via RRBAC roles or even via super roles protecting individual super role instances.

Furthermore, nested super role instances can be exported to external authorisation providers as a hierarchy of roles. This allows leveraging access control inheritance models provided by other authorisation systems when managing role assignments in a centralised security component.

The super role concept allows overcoming one inherent limitation of all the existing RRBAC models, which restrict a role domain associated to a specific role instances to protect exactly one sub-hierarchy of resources of the protected resource hierarchy. Certain IRBAC role instances assigned to a certain domain root resource can never contain permissions on resources that are outside of the sub-tree rooted at this domain root resource. The super roles concepts allows adding a set of IRBAC role instances to one super role instance. As a result, one single super role instance can contain permissions on various sub-hierarchies within the protected resource hierarchy, establishing higher levels semantic roles that contain all permissions necessary to fulfill a specific task within the system.

Furthermore, the invention refers to a role-based access control method. The role-based access control method comprises the steps of defining roles to be sets of permissions on individual resources, thus forming role instances, respectively, and grouping a set of role instances, so that each super role contains all permissions contained in the grouped role instances.

In a further embodiment of the claimed method, the super role is registered within a structure of protected resource instances, thus defining a protected super role instance.

In another embodiment of the method, it is possible that the role-based access control method according to the present invention comprises the steps of defining a set of permissible actions for a role type, providing a structure of nodes, wherein the nodes represent computer-based resources, binding the role type to a node of the structure of nodes, thus forming a role instance and grouping a set of role instances of a structure of role instances into one super role defining, so that the one super role contains all permissible actions contained in all the role instances grouped into the super role. In this case, the method is based on the already described IRBAC model.

Based on the IRBAC model, it is thus possible, as already described before, that the structure of role instances corresponds to a hierarchical tree of role instances and each role instance within the structure of role instances has an associated domain root instance, so that an instance of a role type is inherited by hierarchical descendants of the domain root instance.

The method can further comprise a step of establishing a role type block for the role type, wherein the role type block limits inheritance of the instances of the role type.

Moreover, it is possible that super roles are nestable, forming a super role nesting structure. The method according to the present invention can further comprise the step of assigning a super role dynamically to at least one user or user group by associating an assignment condition to individual super role assignment.

Furthermore, the present invention covers a computer program product and a computer program for role-based access control.

A computer program product with a computer-readable medium and a computer program stored on the computer-readable medium with a program code is provided, wherein the program code is suitable for carrying out the method according to the present invention when the computer program is run on a computer.

The present invention refers also to a computer program with a program code which is suitable for carrying out a method according to the present invention when the computer program is run on a computer.

The present invention also deals with a computer-readable medium with a computer program stored therein, the computer program comprising a program code which is suitable for carrying out a method according to the present invention when the computer program is run on a computer.

Further features and embodiments of the invention will become apparent from the description and the accompanying drawings.

It will be understood that the features mentioned above and those described hereinafter can be used not only in the combination specified but also in other combination or on their own, without departing from the scope of the present invention.

BRIEF DESCRIPTION OF THE DRAWINGS

The invention is schematically illustrated in the drawings by way of example and is hereinafter explained in detail with reference to the drawings. It is understood that the description is in no way limiting on the scope of the present invention and is merely an illustration of a preferred embodiment of the invention.

Other aspects and advantages of the invention will become apparent upon review of the detailed description and upon reference of the drawings in which.

DETAILED DESCRIPTION OF THE PRESENT INVENTION

Figure 1:
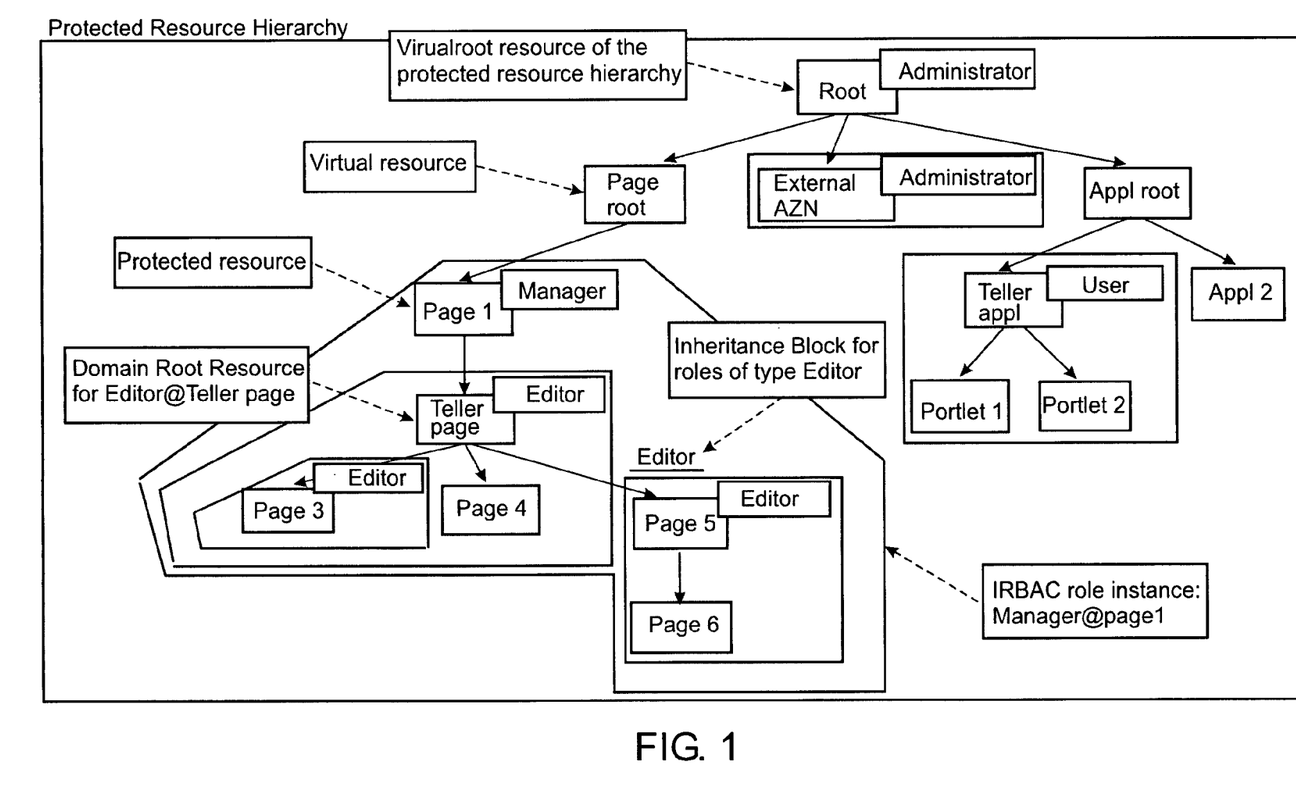
FIG. 1 shows a schematic diagram of an embodiment of a role-based access control system according to the IRBAC model.

FIG. 1 describes a possible scenario according to the IRBAC model. Each role within the IRBAC model has an associated role type. A role type is a set of actions in the first place and models a specific way of interaction with resources depending on job responsibilities. The role type "Editor" for example could contain actions "View", "Edit", "Add Child", etc., because editors are usually responsible for modifying resources and creating new resources. Furthermore, each role instance has an associated domain root resource. A naming convention for an IRBAC role instance is "role@domain root resource". FIG. 1 depicts for example a role instance of type "Manager" tied to resource "page 1" called "Manager@page 1". A set of permissions contained in a specific IRBAC role instance is defined by building the Cartesian Product between the set of actions contained in the corresponding role type and the set of resources contained in the sub-tree rooted at the role's domain root resource, the so-called role domain. In FIG. 1 is depicted a role "User@Teller app". The "User" role type can be defined for example to contain only one single action called "View". As a result, the role "User@Teller app" contains the permissions (view, Teller app), (view, portlet 1) and (view, portlet 2).

Role domains can be restricted by introducing role blocks. Role blocks can be tied to individual resources and role blocks are role type specific. A role block prevents the sub-tree rooted at the resource carrying the block from being included in role domains of the same role type and some ancestor domain root resource. For instance, FIG. 1 shows a role block of type "Editor" located at resource "page 5". As a result "page 5" and "page 6" are not contained in the role domain of the role "Editor@Teller page".

Figure 2:
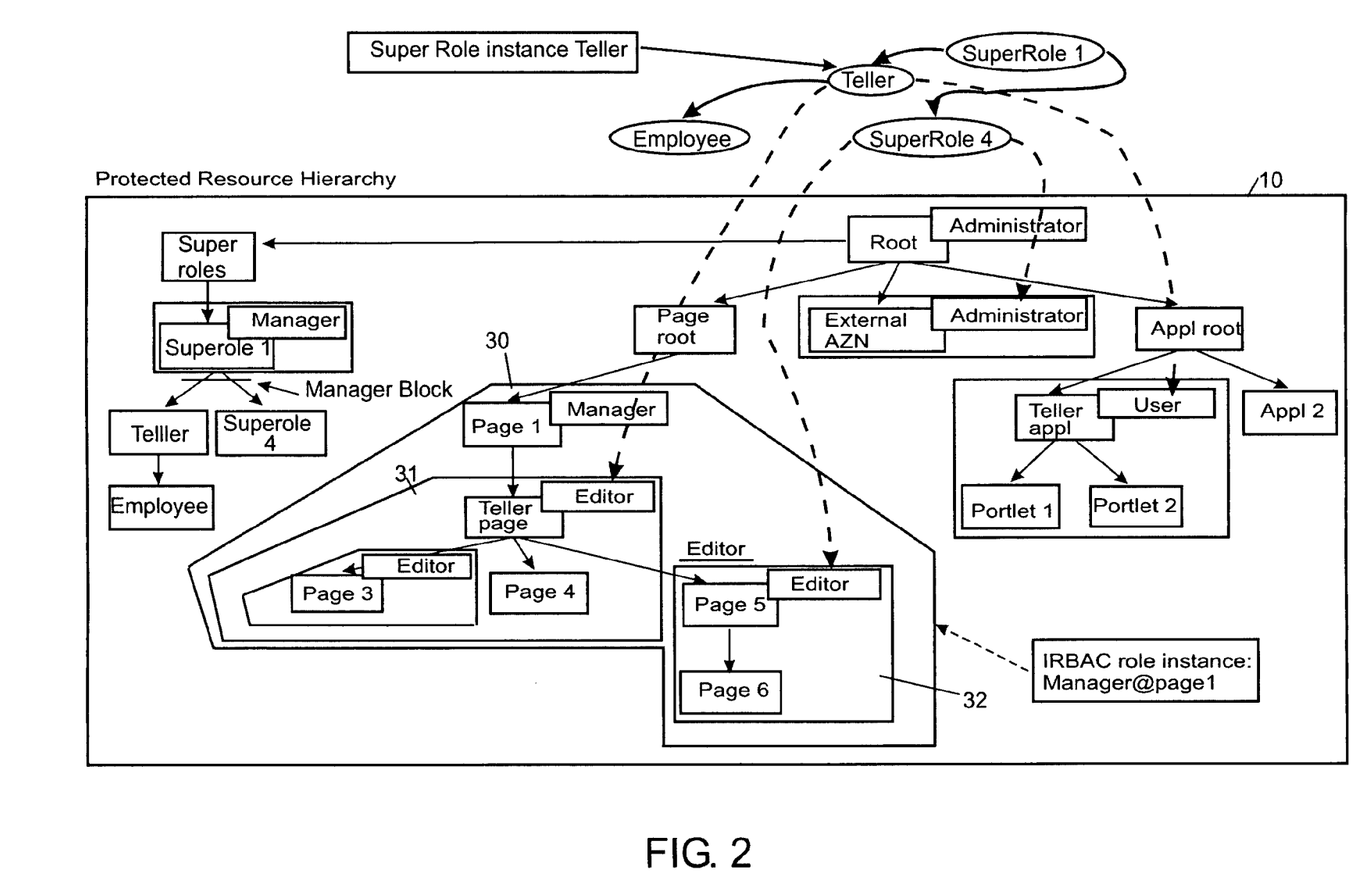
FIG. 2 shows a schematic diagram of an embodiment of a role-based access control system according to the invention.

FIG. 2 shows an illustrated hierarchical tree 10. In general, the small rectangular nodes of tree 10, each represent a resource. Above the hierarchical tree 10, four super roles are shown, a super role, called "SuperRole 1", a super role, called "Teller", a super role, called "SuperRole 4", and a super role, called "Employee". The super roles are arranged in a hierarchical manner. Super role "SuperRole 1" contains super role "Teller" and super role "SuperRole 4", while super role "Teller" contains super role "Employee". That means that all permissions coupled with super role "Teller" and "SuperRole 4" are also assigned to super role "SuperRole 1". All permissions assigned to super role "Employee" are also assigned to super role "Teller" and thus to super role "SuperRole 1".

Hierarchical tree 10 shows in a highest level a resource called "root". The second level comprises resources, called "super roles", "page root", "external AZN", and "app root". Each of those resources are roots for further sub-trees, respectively. In the following, the sub-tree starting with "page root" will be considered first. In order for access control under the present invention to be provided, the role type will first be defined via a role definition system. In general, a role type is defined based on a set of actions that are permitted to be carried out by a user or a group of users assigned to role instances of that role type. For example, a "Manager" role type might contain actions that imply being able to read data objects from object space and write new objects to an object space, while not containing actions that would imply being permitted to edit existing data objects.

Conversely, an "Editor" role might be able to read, write and edit data objects. Once role types have been defined, they can be assigned/bound to specific resources of tree 10. As it is shown within the diagram, the "Manager" role type has been bound to resource "page 1", which is directly located below the resource "page root". Within the shown example, when the role type is bound to a resource in tree 10, instances of that role type and the permissible actions therefor will be inherited by all hierarchical descendants unless a role type block has been established. Thus, for example, the "Manager" role type bound to resource "page 1" will be inherited by resource "page 5" which corresponds to the previously described IRBAC model. As further shown in FIG. 2, the concept of binding role types to resources and role inheritance leads to the creation of so-called role domains. A role domain is defined by the resources, to which a role type has been bound or inherited. Under the bindings shown in FIG. 2 starting from resource "page root", three separate domains have been created, namely domains 30, 31 and 32. Domain 30 is defined by the binding of the "Manager" role type to resource "page 1". As further shown in FIG. 2, the "Editor" role type has been assigned to resource "Teller page" which leads to the creation of two domains wherein domain 31 is incorporated by domain 30. Domain 32 is separate from domain 31, but incorporated by domain 30. As indicated above, instances of role types within the shown embodiment are inherited unless a role type block has been established. For example, an inheritance block for the "Editor" role type has been established on resource "page 5". In this case the "Editor" role type bound to resource "Teller page" will not be inherited by resources "page 5" or "page 6". However, it will still be inherited by resources "page 3" and "page 4". An inheritance block for a special role type does not effect instances of other role types. The "Manager" role type which has been established on resource "page 1" is still inherited by resources "page 5" or "page 6".

The already mentioned super roles are created by grouping several role instances, which is described by dashed lines. Super role "Teller" for example is formed by grouping role instance "Editor@Teller page" and "User@Teller app". That means that super role "Teller" contains all permissions of role instances "Editor@Teller page" and "User@Teller app". As a result, users being assigned the "Teller" super role are allowed to operate as "Editor" on the resource "Teller page" and as "User" on the resource "Teller app" and via inheritance as "Editor" on the resource "page 3" and "page 4" and as "User" on the resources "portlet 1" and "portlet 2".

As further shown in FIG. 2, the flexibility of super roles is further exploited by treating super roles as protected resources themselves, namely by registering the super role instances themselves within a protected resource hierarchy. The already mentioned super roles "SuperRole 1", "Teller", and "SuperRole 4" are registered within the hierarchical tree 10. On the second level of tree 10, there are shown "super roles" as a virtual resource. "SuperRole 1" is shown as protected resource just below this virtual resource. FIG. 2 also shows a role instance "Manager@SuperRole 1" that controls access to the protected super role instance "SuperRole 1". The super roles "Teller" and "SuperRole 4" are descendants of "SuperRole 1". An inheritance block for the "Manager" role type has been established on those protected super role instances so that the "Manager" role type bound to "SuperRole 1" will not be inherited by protected super role instances "Teller" and "SuperRole 4".

Super roles can have a nesting structure. Therefore, it is possible that one super role contains all permissible actions necessary to fulfill a specific task within the system. It is possible now to add a set of IRBAC role instances to one super role instance. As a result, one single super role instance can contain permissions on various sub-hierarchies within the protected resource hierarchy 10, establishing higher level semantic roles that contain all permissions necessary to fulfill a specific task within the system. For instance, a banking portal application for example can define a so-called "Teller" super role that at the same time contains permissions on corresponding portal pages and portlets although those resources reside in different parts of the protected resource hierarchy 10, as depicted in FIG. 2. Thus, assigning a specific user this one "Teller" super role instance grants this user all instance-level permissions necessary to use the set of resources that make up the banking portal application in the way appropriate for banking tellers. This allows access control administration on an even higher level as within the IRBAC model or other previously described RRBAC models. Furthermore, this reduces administration overhead. Furthermore, this "Teller" super role still provides a fine-grained instance level resource protection for specific page and portlet instances.

Super roles model job responsibilities on a semantic level. Due to this fact, super roles are ideal candidates for introducing a dynamic access control administration concept. This means, an assignment of individual super roles can be tied to additional conditions, as for example a state of an associated workflow object. In the banking example mentioned before, this could be used to assign a specific user the "Teller" super role instance under the condition that this user actually has a pending work item that requires this user to actually act as a teller. Such a setup reduces the set of authorised people necessary at a specific point in time and thus improves over all security and auditability. There are many other possible scenarios that can leverage such dynamic super role assignment facilities. Already known roles such as RRBAC roles or IRBAC roles are not well suited for being assigned in a dynamic fashion since they tend to be too granular and due to the IRBAC role definition there cannot exist multiple IRBAC role instances of a same role type tied to a same domain root resource. With super roles, multiple super role instances can be defined containing the same permissions tied to various different conditions.

Furthermore, super roles themselves can be arranged in a hierarchical manner, as already indicated, providing a way to establish access to access control administration concepts on multiple levels of granularity fitting corresponding groups of different administrators and stakeholders. For instance, it is possible to create a super role containing various other super roles instances like the previously mentioned "Teller" super role, if a less fine-grained access control administration is required for some group of administrators. This flexibility is further exploited by treating super role instances as protected resources themselves. Registering a super role as protected resource within the protected resource hierarchy 10 allows for even more fine grained control over access control delegation then provided by the previously mentioned IRBAC delegation model. For instance, the sensitive operation of "assigning a specific user as specific super role" can be protected by enforcing a specific instance level permission on the corresponding super role instance. Thus, it is possible to establish roles that allow delegated administrators to only manage any assignments of users to predefined super roles and prevent them from being allowed to modify underlying lower level IRBAC roles and/or to modify corresponding role blocks. For example the IRBAC role "Manager@superRole 1" contains permissions to manage this specific super role only. In the IRBAC delegation model, it is impossible to prevent a user that is allowed to create role assignments for a specific IRBAC role from modifying the IRBAC role itself as for example by creating a role block for the corresponding role type.

Providing instance level protection for super role instances will also be advantageous in collaboration scenarios where explicit view access to access control configuration is often required when collaborative communities are modelled through super role or only role assignments. Thus, being assigned a specific super role does not automatically mean the allowance to query for "who else is assigned to this role" like it would be the case in the IRBAC model. With super roles being protected on a super role instance level, it becomes possible to enforce an instance level "View" permission on the super role itself, providing an additional flexibility that turns out to be crucial for collaborative environments.

Furthermore, registering the super role instances at the protected resource hierarchy 10 according to a super role nesting structure allows exporting this hierarchy information into external authorisation providers. Such authorisation providers are usually used to provide for a centralised access control administration throughout a complete enterprise. External authorisation providers can than exploit the hierarchy through the specific inheritance models.

The already mentioned and described IRBAC model only supports checking for individual permissions during an application runtime. This means that IRBAC roles are only part of the administration model. They are not available in the runtime model that is optimised for performance. Super roles are supposed to also be part of the authorisation runtime model providing an efficiently implementation of an "isUserInRole" method which is known from the J2EE authorisation model. This will also support bridging the gap between the J2EE authorisation and instance-level authorisation concepts.

Implementing super role concepts require supporting some super role administration facilities and recognizing a super role configuration during access control decision making. The semantic information associated to a specific super role instance consists of the following properties:

The first property is the "name" which is used to uniquely identify a specific super role instance within a set of super role siblings parented by a specific super role instance. A system-wide unique identification is achieved by concatenating the individual super role names to a path-like structure. For instance, the super role "Teller" in FIG. 2 is uniquely identifiable within the system via the full name "SuperRole 1/Teller", since "Teller" is a child role of "SuperRole 1".

The second property is the parent role which identifies the enclosing super role instance of a specific super role as for example "SuperRole 1" for the "Teller" role. This information can be represented by a single reference to an individual super role instance. This is a true 1-to-many relationship guaranteeing a hierarchical nesting of individual super roles. In a physical data model, this is typically achieved by storing the parent role reference in a dedicated table column.

A third property is a set of associated RRBAC roles. This property together with the parent role property defines an actual set of permissions contained in a specific super role instance. This information can be represented by a set of references to individual RRBAC role instance. In a physical data model, this is typically achieved by establishing a database relation between a table storing RRBAC role instances and a table storing super roles instances. Individual RRBAC role instances can be referenced from multiple super role instances.

Another property is an externalisation state which reflects whether user and user group assignments for a specific super role shall be managed by an external authorisation provider.

In addition to this, an access control system leveraging the super roles concept must also be able to manage the mapping of individual super role instance to individual user or user groups, usually called "principals", as for example managing the super role assignments. The semantic information associated to a specific super role assignment should consist of the following information. First of all, there should be a principle reference which identifies the principal that has been assigned a specific super role instance. This can be for example an individual user, a user group or some other entity within the system that can be authorized for executing sensitive operations. This information can be represented by a reference to a specific principle within a user registry as for example identified via its distinguished name. In a physical data model, this is typically achieved by establishing a foreign key relationship to some table storing principle information.

A second property should be a super role reference which identifies a super role instance. In a physical data model, this is typically achieved by establishing a foreign key relationship to some table storing super role instances.

Furthermore, there is an optional property called assignment condition which identifies an external condition that can be associated to a specific super role assignment. Such condition could be defined via some specific service programming interface (SPI) that can be implemented in various ways, leveraging external information that exists in the system. This can be for example a workflow engine. An access control decision engine recognizes super roles assignment condition during access control decision making and ignores those role assignments for which the associated condition, if defined, evaluates to false.

Figure 3:
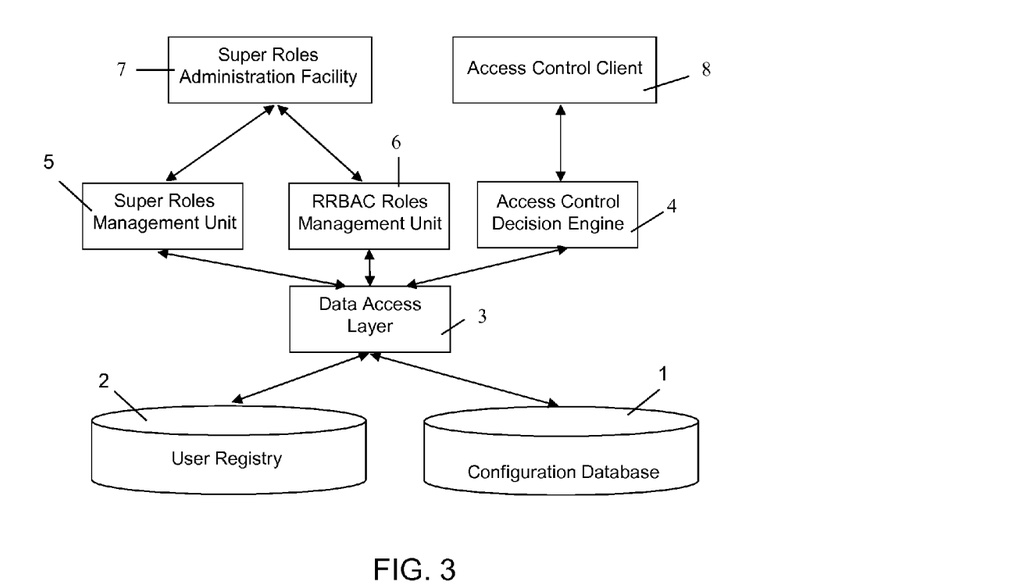
FIG. 3 shows system components of a further embodiment of a role-based access control system according to the present invention.

Referring to FIG. 3, several system components of a role-based access control system according to the present invention are shown which support a management of the super role and super role assignment properties. Those system components are included by or linked to a control computer that provides access control for computer-based resources. All components may reside at a single physical location or be distributed across a plurality of physical systems in various forms. As already explained, resources are intended to represent any type of computerized resources within a computer infrastructure that a user or a group of users may attempt to access or otherwise interact with. For example, resources could include dynamic object spaces, software components, hardware components, etc. The control computer is intended to represent any type of computerised system capable of carrying out the functions of the present invention. For example, the control computer could be a server, a workstation, a desktop computer, a laptop computer, a handheld device, etc. In the configuration database 1 are stored for example existing RRBAC roles, super roles and super role assignments. Configuration database 1 contains all data, necessary for the whole system except for user identifications and user group nesting information which is stored in a user registry 2. The database 1 can include one or more storage devices, such as a magnetic disk drive or an optical disk drive. Database 1 can also include data distributed across, for example, a local area network (LAN), wide area network (WAN) or a storage area network (SAN). The user registry 2 is typically some LDAP (Lightweight Directory Access Protocol) implementation. All data is accessed via a data access layer 3 that abstracts the configuration database 1 and also the user registry 2. The configuration database 1 and the user registry 2 can be located on further computers, which are linked with the control computer. The other components shown within FIG. 3 are generally all located on the control computer. An access control decision engine 4 has to recognize existing RRBAC roles, super roles and super role assignments which are stored in the configuration database 1. In general, a specific user is allowed to execute a sensitive operation, if a union of all permissions contained in all the RRBAC role instances assigned to this user or to a user group the user belongs to and all the RRBAC roles contained in any super role instances assigned to this user or one of the user groups the user belongs to contains all the permissions required by the sensitive operation. A specific RRBAC role instance is considered to be contained in a specific super role if and only if the RRBAC role is listed in a "set of associated RRBAC roles" property of the respective super role instance or any nested child super role instance of the super role instance. During retrieving of assigned super role instances, all conditions that may be attached to the corresponding super role assignment must be evaluated and those assignments that evaluate to false must be ignored during the further evaluation. FIG. 3 further shows a super roles management unit 5 and a RRBAC roles management unit 6 which can communicate with each other. A super role administration facility 7 supports the management unit of the super roles management unit 5 and of the RRBAC roles management unit 6. The super role administration facility 7 supports the super roles and RRBAC roles management units 5 and 6 for example by exposing operations to create new root super role instances, to create new child super role instances underneath a specific role instance, to update a specific super role instance by adding and/or removing specific RRBAC role instances, to read a specific super role instance by querying the set of existing super role assignments for a specific super role instance or by querying the set of RRBAC role instances contained in a specific super role, to delete a specific super role instance, implicitly deleting all child super roles, to create or delete individual super role assignments, and to add or remove individual conditions to individual super role instances. A user can communicate over an access control client 8 directly with the access control decision engine 4.

Figure 4:
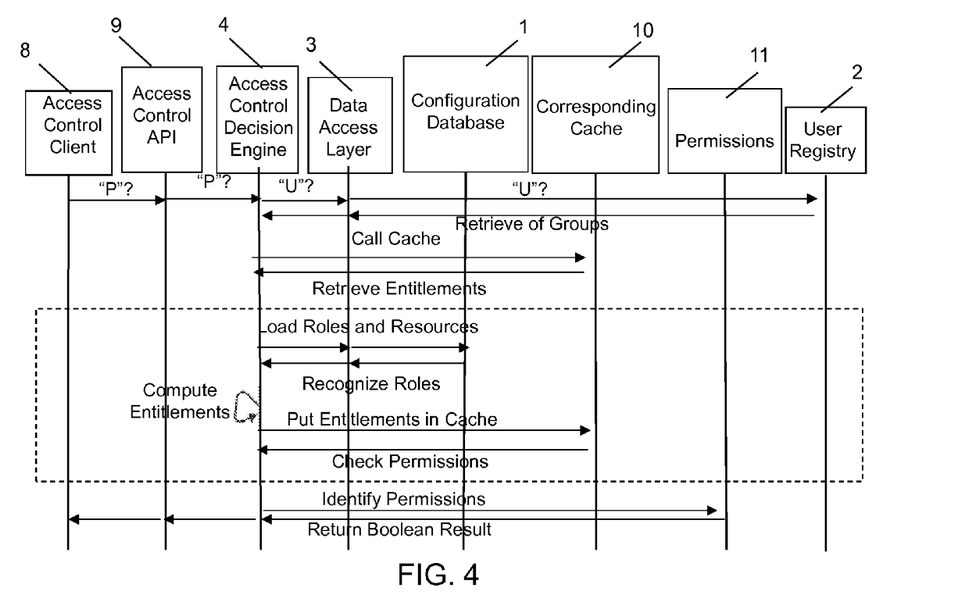
FIG. 4 shows a schematic diagram for an entitlements based permission check of another embodiment of a role-based access control system according to the present invention.

Referring to FIG. 4, a sequence diagram is shown, describing a server system functionality according to the present invention through which a system synchronises and manages access to one or more resources, such as databases or database servers. Client requests are received by the system, processed and a response to the client is created and transmitted to the client. One simple implementation for the described logic can be based on first computing a union of permissions, so-called entitlements, for individual user groups and users, if not already done before and stored in a corresponding cache, and checking if all permissions required by a sensitive operation are implied by this set of permissions. Alternatively, this can be also done on a per resource type basis reducing caching granularity and cache invalidation penalty. This also already provides the functionality of resource type based entitlements as typically required in so-called Web Portal Solutions like for example the so-called WebSphere Portal™. This model is applicable to many server paradigms, including for example online banking, order entry and tracking, e-commerce and electronic mail processing.

Super role assignment checks, like queries, can be implemented by building an intersection between a specified super role instance and the union of all super role instances either assigned directly the given principle or to one of their principles within the user groups. If there are super role assignments involved that carry additional conditions, these must first be evaluated.

In order to enforce a consistent access control policy within a system, all system components claiming access control for their component resources call the access control decision engine 4 to verify if an executing user has enough permissions to access the system components. This can be done for example in the way described in the following.

The user wants to execute a specific operation "O" on a component effecting a specific set of resources "R". The component determines a set of required permissions "P" based on the operation "O" and the set of affected resources "R" according to the security policy claimed by the system component. The system component becomes an access control client 8 by calling an access control decision engine 4 via an access control API (Application Programming Interface) 9. The access control decision engine 4 is located between the access control client 8 and a data access layer 3. The access control client 8 enquires the access control decision engine 4 whether the executing user "U" has all required permissions "P". In a first step, the access control decision engine 4 identifies the executing user "U" by calling a user management or registry 2 via the data access layer 3. The identity of the executing user "U" is determined during user authentication against the user registry 2 at log-in time. The access control decision engine 4 gets via the data access layer 3 groups for principal corresponding to the executing user "U". That means that the access control decision engine 4 retrieves all groups to which the executing user "U" belongs to. In a further step, the access control decision engine 4 retrieves entitlements assigned to the user "U" by calling a corresponding cache 10. In case that all entitlements assigned to the user or to one of the user groups the user belongs to have already been computed, all those entitlements assigned directly to the user or to one of the user groups the user belongs to are stored within cache 10. Afterwards, the access control decision engine 4 identifies the set of permissions "P" to be checked. The access control decision engine 4 checks if the super set of all permissions 11 assigned to the executing user "U" via RRBAC roles or super roles imply all the permission contained in the set of requested permissions "P" and returns the Boolean result to the access control client 8. Depending on the result of the access control decision engine 4, the access control client 8 either allows or prevents an execution of operation "O".

In case that the entitlements for the executing user "U" are not already stored in the corresponding cache 10 as indicated by the dashed line, the access control decision engine 4 first loads roles and resources assigned to the executing user "U" or to one of the user groups the user belongs to. All this information is accessed via the data access layer 3 that abstracts the configuration database 1. Thus, the access control decision engine 4 recognizes existing RRBAC roles, super roles and super role assignments stored in the configuration database 1 and computes with help of this information the entitlements for user "U" which is indicated by a bent arrow. After having computed the entitlements, the entitlements are put into the appropriate corresponding cache 10. Afterwards, the access control decision engine 4 checks if the set of all permissions assigned to the executing user via RRBAC roles or super roles imply all permissions based on the operation and returns to the access control client 8 which either allows or prevents an execution of operation "O".

Another concrete example can be described with reference to the so-called WebSphere™ Portal, which is a product of IBM. In the WebSphere™ Portal for example, an authorization check whether a given user, say "Bob", is allowed to view a given portal page, say "Teller Page", would be executed as follows: the access control client 8 in this case would be a portal page aggregation component. Before this component includes the "Teller page" into a markup that will be presented to the user "Bob", it will do a so-called "haspermission( ) call" against the access control API 9 in order to check whether "Bob" has been granted the permission (view, Teller page). The access control decision engine 4 will accept this method call and retrieve the list of user groups "Bob" belongs to from the user registry 2. The access control decision engine 4 will then check with help of this list whether one of the user groups or "Bob" himself has been granted the permission (view, Teller page). In a simple implementation, this can be done by retrieving all permissions granted to "Bob" or to one of the user groups "Bob" belongs to, respectively. The resulting sets of permissions are called entitlements. These entitlements are stored in a cache 10. If one of those entitlements implies the requested permission, the access control decision engine 4 will grant access, otherwise it will deny access. The entitlements for a specific user or user group are computed (indicated by the dashed line) by building the super set of all permissions contained in all roles either assigned directly to the user "Bob" or to one of the user groups "Bob" belongs to or assigned via an enclosing super role assignment to the user "Bob" or to one of the user groups "Bob" belongs to.

It should be appreciated that the teachings of the present invention could be offered as a business method on a subscription or fee basis. For example, the system according to the present invention could be created, supported, maintained and/or deployed by a service provider that offers functions for customers. That is, a service provider could offer to control access for computer-based resources as described above.

It should be understood that the present invention can be realised in hardware, software, or any combination thereof. Any kind of computer/server system or systems or other apparatus adapted for carrying out the methods described herein is suited. A typical combination of hardware and software could be a general purpose computer system with a computer program that, when loaded and executed, carries out the respective methods described herein. Alternatively, a specific use computer, containing specialised hardware for carrying out one or more of the functional tasks of the invention, could be utilized.

We claim:

1. A role-based access control system, comprising:
    a role definition system for defining roles to be sets of permissions on individual resources thus forming role instances, respectively;
    a super role definition system for defining at least one super role by assigning at least one set of role instances to at least one group and assigning the at least one group to the at least one super role,
    wherein each super role is modified by adding or removing the role instances from the at least one group, and
    wherein each super role is nested according to a plurality of properties including a name, a parent role, the set of role instances, and an externalisation state; and
    a super role assignment system for assigning a user or a user group to the at least one super role.

2. The system according to claim 1, wherein the role definition system is configured for defining role types by assigning one set of permissible actions to one role type, respectively, further comprising a role binding system for binding role types to resources of a structure of resources, respectively, thus forming a structure of role instances, wherein the structure of role instances corresponds to a hierarchical tree of role instances and each role instance within the structure of role instances has an associated domain root instance, so that an instance of a role type is inherited by hierarchical descendants of the domain root instance.

3. The system according to claim 2, further comprising a role blocking system for establishing a role type block for the role type, wherein the role type block limits inheritance of the instances of the role type.

4. The system according to claim 1, wherein each super role is registered within a structure of protected resource instances, thus defining a protected super role instance.

5. The system according to claim 1, wherein the at least one super role is dynamically and conditionally assigned to the user or the user group, and wherein the assigning is conditioned upon a status of an associated workflow object.

6. A role-based access control method, comprising:
    defining roles to be sets of permissions on individual resources, thus forming role instances, respectively;
    assigning at least one set of role instances to at least one group and assigning the at least one group to at least one super role; and
    nesting each super role according to a plurality of properties including a name, a parent role, the set of role instances, and an externalisation state,
    wherein each super role is modified by adding or removing the role instances from the at least one group.

7. The method according to claim 6, the defining step including
    a. defining role types by assigning one set of permissible actions to one role type, respectively;
    b. providing a structure of resources; and
    c. binding the role types to resources of the structure of resources, thus forming a structure of role instances.

8. The method according to claim 7, wherein the structure of role instances corresponds to a hierarchical tree of role instances and each role instance within the structure of role instances has an associated domain root instance, so that an instance of a role type is inherited by hierarchical descendants of the domain root instance.

9. The method according to claim 7, comprising the further step of establishing a role type block for the role type, wherein the role type block limits inheritance of the instances of the role type.

10. The method according to claim 6, wherein each super role is registered within a structure of protected resource instances as a protected resource instance, thus defining a protected super role instance.

11. The method according to claim 6, further comprising assigning a user or a user group to the at least one super role.

12. A computer program product stored on a non-transitory computer-readable storage medium which when executed by a computer, causes the computer to control access, the controlling comprising:
    defining roles to be sets of permissions on individual resources, thus forming role instances, respectively;
    assigning at least one set of role instances to at least one group and assigning the at least one group to at least one super role; and
    nesting each super role according to a plurality of properties including a name, a parent role, the set of role instances, and an externalisation state,
    wherein each super role is modified by adding or removing the role instances from the at least one group.

13. The computer program product of claim 12, wherein the defining includes
   a. defining role types by assigning one set of permissible actions to one role type, respectively;
   b. providing a structure of resources; and
   c. binding the role types to resources of the structure of resources, thus forming a structure of role instances.

14. The computer program product of claim 13, wherein the structure of role instances corresponds to a hierarchical tree of role instances and each role instance within the structure of role instances has an associated domain root instance, so that an instance of a role type is inherited by hierarchical descendants of the domain root instance.

15. The computer program product of claim 13, comprising the further step of establishing a role type block for the role type, wherein the role type block limits inheritance of the instances of the role type.

16. The computer program product of claim 12, wherein each super role is registered within a structure of protected resource instances as a protected resource instance, thus defining a protected super role instance.

17. The computer program product of claim 12, further comprising assigning a user or a user group to the at least one super role.

\* \* \* \* \*